United States Patent

Odom et al.

[19]

[11] Patent Number: 6,150,655

[45] Date of Patent: Nov. 21, 2000

[54] INFERENTIAL MEASUREMENT OF PHOTOELECTRIC ABSORPTION CROSS-SECTION OF GEOLOGIC FORMATIONS FROM NEUTRON-INDUCED, GAMMA-RAY SPECTROSCOPY

[75] Inventors: Richard Charles Odom, Benbrook; Shawn Marie Bailey, Fort Worth, both of Tex.

[73] Assignee: Computalog Research, Inc., Fort Worth, Tex.

[21] Appl. No.: 09/036,287

[22] Filed: Mar. 6, 1998

[51] Int. Cl.⁷ ........................................................ G01V 5/12
[52] U.S. Cl. ...................................... 250/269.6; 250/269.7
[58] Field of Search ................................ 250/269.6, 269.7

[56] References Cited

U.S. PATENT DOCUMENTS

| | | | |
|---|---|---|---|
| 4,048,495 | 9/1977 | Ellis | 250/264 |
| 4,055,763 | 10/1977 | Antkiw | 250/270 |
| 4,297,575 | 10/1981 | Smith, Jr. et al. | 250/265 |
| 4,628,202 | 12/1986 | Minette | 250/269 |
| 4,810,876 | 3/1989 | Wraight et al. | 250/256 |
| 5,900,627 | 5/1999 | Odom et al. | 250/269.6 |

OTHER PUBLICATIONS

L.A. Jaconson, R. Ethridge, and D.F. Wyatt, Jr., "A New thermal Multigate Decay–Lithology Tool," SPWLA 35th Annual Logging Symposium, Jun. 19–22, 1994.

Jeffrey L. Baldwin, Richard M. Bateman, Charles L. Wheatley, "Application of a Neural Network to the Problem of Mineral Identification from Well Logs," The Log Analyst, Sep.–Oct.,1990.

Darwin V. Ellis, "Well Logging for Earth Scientists", Elsevier Science Pub., 1987.

D.C. McCall and J.S. Gardner, "Litho–Density Log Applications in the Michigan and Illinois Basins," SPWLA Twenty–Third Annual Logging Symposium, Jul. 6–9, 1982.

J.H.Fang, C.L. Karr, D.A. Stanley, "Transformation of Geochemical Log Data to Minerology Using Genetic Algorithms," The Log Analyst, Mar.–Apr. 1996.

L.A. Jocobson and D.F. Wyatt, "Elemental Yields and Complex Lithology Analysis from the Pulsed Spectral Gamma Log," The Log Analyst, Jan.–Feb., 1996.

http://www.recsys.com/neural2.htm, "Neural Computing–Inside the Black Box," Oct. 1997, Recognition Systems, Inc.

*Primary Examiner*—Constantine Hannaher
*Assistant Examiner*—Andrew Israel
*Attorney, Agent, or Firm*—Felsman, Bradley, Vaden, Gunter & Dillon, LLP

[57] ABSTRACT

A method for inferring the photoelectric absorption of a formation by directly mapping spectroscopic measurements of gamma rays induced in the formation using a fast neutron source. The mapping is accomplished by creating a polynomial function based on counts of gamma-ray events in the gamma-ray energy spectrum; the coefficients of the polynomial function are determined in known calibration environments, and the value of the polynomial is the inferred photoelectric absorption parameter. The spectroscopic measurements are preferably generated by sorting gamma-ray counts of the gamma-ray spectrum into a plurality of energy-dependent channels, and measuring these gamma-ray energy distributions during different portions of the firing cycle where different types of dominant gamma-ray production reactions occur.

16 Claims, 5 Drawing Sheets

INFERENTIAL MEASUREMENT OF PHOTOELECTRIC ABSORPTION CROSS-SECTION OF GEOLOGIC FORMATIONS FROM NEUTRON-INDUCED, GAMMA-RAY SPECTROSCOPY

BACKGROUND OF THE INVENTION

1. Field of the Invention

The present invention generally relates to oil and gas well (borehole) logging tools, and more particularly to an improved method of measuring the photoelectric absorption of geologic formations using neutron-induced, gamma-ray spectroscopy.

2. Description of the Related Art

Logging tools for measuring earth formation properties are well known, particularly those used in the location of underground petroleum products (oil and gas). Borehole logging instruments use various techniques to determine geophysical properties such as bulk density, porosity, water saturation, gas saturation, and lithology. The determination of the lithology of the formation, i.e., whether the predominant minerals are sandstone, limestone, dolomite, etc., is important in correlation and correction of the logging measurements and in describing reservoir parameters such as porosity typing and permeability.

Techniques for ascertaining formation properties include those involving the use of radiant (electromagnetic) energy. For example, gamma rays are commonly used to measure bulk density of a formation by detecting such radiation as it passes through the formation, and relating the amount of detected radiation to the electron density of the formation. See, e.g., U.S. Pat. No. 4,297,575. Gamma rays can be emitted continuously from a source in the borehole tool and propagate outward into the formation. This approach is known as gamma-gamma logging, because gamma rays originate in the tool, and the backscattered rays are thereafter detected in the tool. A typical gamma-ray source is cesium-137. Formation properties can be determined based on the count rate or intensity of the gamma rays that are received at detectors located in the tool. Usually at least two detectors (far and near) are used, which allows a measure of formation density that is essentially independent of the mudcake surrounding the tool (the mudcake is the layer of solid material lining the open borehole that has consolidated from the drilling fluid).

Instead of providing a radioactive gamma-ray source, gamma radiation can be produced in the formation in response to a high-energy neutron source (i.e., a neutron accelerator located in the borehole tool). This technique is referred to as induced gamma-ray logging. When the neutron source is pulsed, gamma rays are produced by one of three reactions:

inelastic scattering of fast neutrons, thermal neutron capture, and from the decay of radioisotopes created by neutron activation. The fast-neutron lifetimes are very small (a few microseconds) such that during the source pulse a mixed-energy neutron field exists. Shortly after the burst, all neutrons are thermalized (slowed down) and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters). See, e.g., U.S. Pat. No. 4,055,763.

Another common parameter which is measured in geophysical well log analyses is the formation photoelectric absorption cross-section. The photoelectric factor (proportional to the photoelectric absorption cross-section) is dependent on the average atomic number of the irradiated sample. The $P_e$ Factor measurements are used to create a profile of the photoelectric absorption cross-section in the formations traversed by the borehole. Quantitative methods have been devised in the prior art for measuring $P_e$. These measurements are useful in determining the formation lithology because of their sensitivity to, e.g., calcium. There are many references in the prior art which provide methods to unambiguously transform derived constituents into lithology. See Fang et al., "Transformation of Geochemical Log Data to Mineralogy Using Genetic Algorithms," Log Analyst, vol. 37, no. 2 (1996).

One standard method for measuring $P_e$ is used in the borehole tool sold by Schlumberger Technology Corp. under the trademark LDT. The LDT tool is a gamma-gamma device, and its method of operation is further described in U.S. Pat. No. 4,048,495. The determination of the photoelectric factor is accomplished by measurement of the shape of the detected gamma-ray spectrum. With a properly calibrated LDT, $P_e$ can be inferred from the relationship between the count rates in a high energy window and a low energy window. A $P_e$ measurement can be further utilized to determine absolute elemental concentrations, as disclosed in U.S. Pat. No. 4,810,876. See also U.S. Pat. No. 4,628,202 which sets forth a variation on the LDT methodology, by developing an interrelationship between the photoelectric factor and density.

Conventional techniques for measuring $P_e$ suffer several disadvantages. First of all, they generally have a shallow depth of investigation into the formation; the irradiated sample is of a relatively small size. Smaller samples additionally cause the tool to be more sensitive to geometry factors, such as borehole rugosity and tool-pad contact, rendering the results less accurate. In cased wells, the very low-energy gamma rays used to measure the photoelectric factor with this prior art cannot penetrate the steel casing. Some of these problems might be mitigated using a neutron-induced spectroscopy system. Prior art systems such as the Schlumberger GST system or the Halliburton PSG system make measurements of individual formation chemical constituents or gamma yields via neutron-induced gamma spectroscopy. See Jacobson et al., "Elemental Spectral Gamma Log," Log Analyst, vol. 37, no. 1 (1996). These types of systems require many slow passes or stationary readings to acquire data with sufficient accuracy on the individual elements that make up the irradiated sample. Then through induction, the elemental gamma yields (and individual errors) and the elemental photoelectric cross-sections could then be combined to estimate the formation photoelectric factor. Similar to measuring miles with a yard stick, this method to determine the $P_e$ factor lacks efficiency and the level of complexity introduces complex systematic errors. Still other prior art systems such as the Halliburton TMD-L use neutron-induced gamma spectroscopy to generate qualitative ratios of Calcium-to-Silicon abundances, but the measurements are often ambiguous and cannot be directly applied to log analysis tools and paradigms that reference the formation $P_e$ factor. It would, therefore, be desirable to devise a method for measuring the formation photoelectric absorption in an earth formation, which overcomes the foregoing limitations.

SUMMARY OF THE INVENTION

It is therefore one object of the present invention to provide an improved method of determining the photoelectric absorption ($P_e$) cross-section of a geologic formation using a borehole tool.

It is another object of the present invention to provide such a method and tool which uses a high-energy neutron source to induce gamma radiation in the surrounding formation.

It is yet another object of the present invention to provide such a method and tool which directly maps neutron-induced spectroscopy measurements to estimate or infer the photoelectric absorption cross-section of the formation, in such a manner that the tool can be used more efficiently.

The foregoing objects are achieved in a method and device for measuring the photoelectric absorption of a geologic formation, generally comprising the steps of inducing gamma rays in the formation, detecting a gamma-ray spectrum associated with the gamma rays, and inferring the photoelectric absorption of the formation by directly mapping spectroscopic measurements of the gamma-ray spectrum. The mapping of the spectroscopic measurements can be accomplished by creating a polynomial function of the gamma ray events in the gamma ray energy spectrum, wherein the value of the polynomial function is the desired photoelectric factor. Mathematical tools, such as a neural network can be used to solve for the polynomial coefficients by minimizing the errors using a set of responses in known formations. The spectroscopic measurements are preferably generated by sorting gamma-ray counts of the gamma-ray spectrum into a plurality of energy-dependent channels, and collecting gamma-ray counts for each channel in at least three time bins, wherein a first one of the three time bins occurs when a dominant gamma-ray reaction is caused by mixed inelastic neutron scattering and thermal neutron capture, a second one of the three time bins occurs when the dominant gamma-ray reaction is caused only by thermal neutron capture, and a third one of the three time bins occurs when the dominant gamma-ray reaction is caused by neutron activation.

The present invention exhibits a much deeper depth of investigation, and a larger sample size than that provided by conventional methods. This direct inversion technique allows estimation of the $P_e$ parameter with one logging pass at improved speeds.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
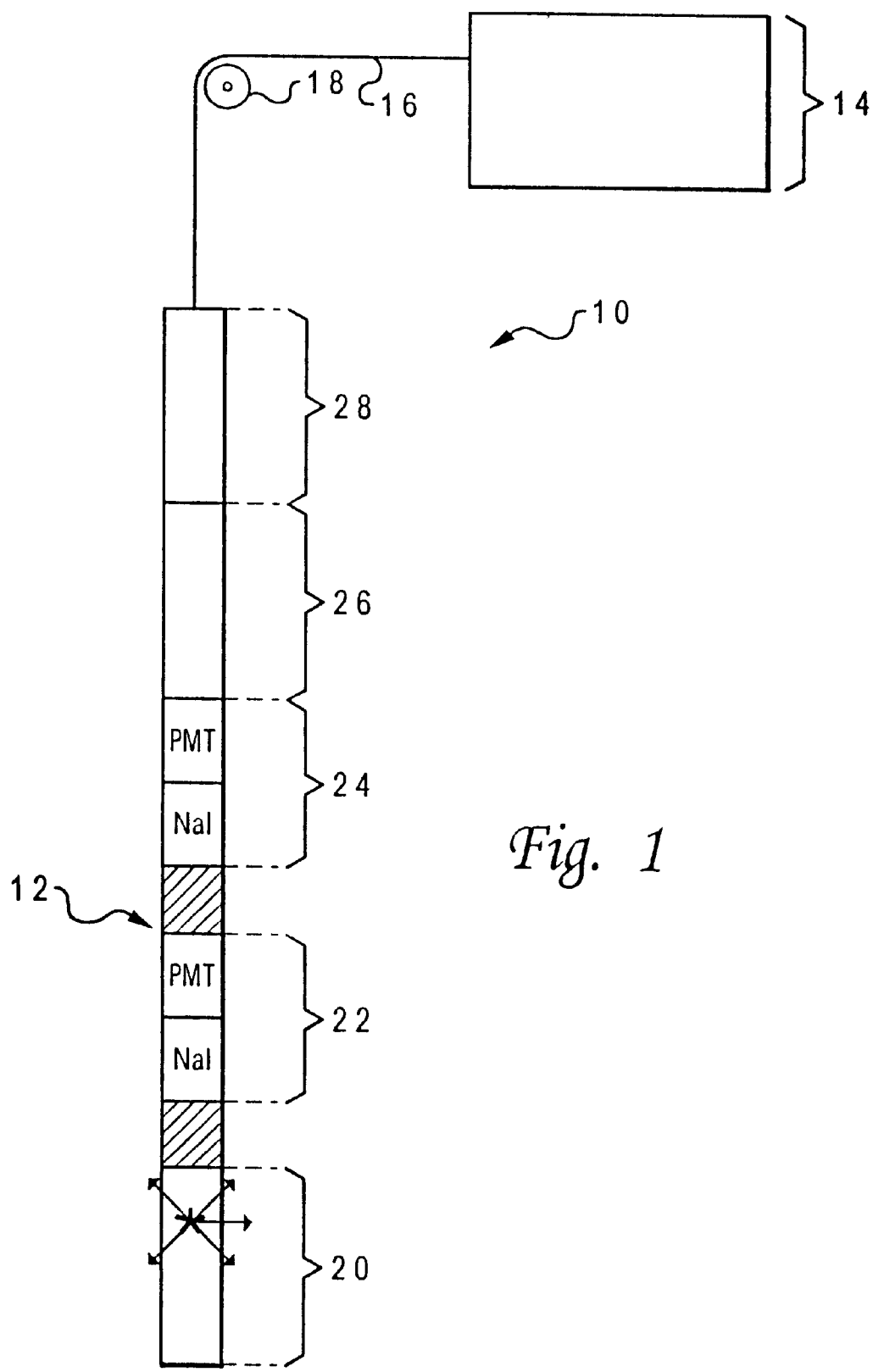
FIG. 1 is a schematic diagram of one embodiment of the photoelectric absorption ($P_e$) cross-section measurement system of the present invention.

With reference now to the figures, and in particular with reference to FIG. 1, there is depicted one embodiment of a photoelectric absorption ($P_e$) cross-section measurement system 10 constructed in accordance with the present invention. System 10 is generally comprised of a sonde or borehole tool 12 which is connected to a surface computer 14 and lowered into the well bore by a wireline 16 and appropriate mechanical support as generally indicated at 18. Surface computer 14 is used for data acquisition, analysis and storage, and can merge $P_e$ output data with other raw measurements for storage and later presentation.

In this embodiment, borehole tool 12 includes a housing having a pulsed neutron source 20, a "near" gamma-ray detector 22, a "far" gamma-ray detector 24, counter hardware 26, and a sonde controller 28. The release of high energy neutrons is used to produce a dispersed gamma source in the formation, centered around the neutron accelerator. Near and far detectors 22 and 24 sense the neutron-induced gamma rays, and counter hardware 26 computes the number of gamma-ray counts detected at various energy levels. Sonde controller 28 processes commands from surface computer 14 and controls the other components of tool 12.

The data acquisition subsystem of tool 12 can be adapted from the tool sold by Computalog (assignee of the present invention) under the model name "PND." That subsystem uses an accelerator-based fast neutron source (D-T tube) with a pulse of 14 MeV neutrons. The near and far detectors are NaI (Tl) crystals optically coupled to high count rate photo-multiplier tubes. In an exemplary implementation, neutron source 20 is pulsed for about 200 $\mu$s ($\tau$) every 2000 $\mu$s. Borehole tool 12 may include other conventional features which are not depicted.

As the pulse of fast neutrons spreads, the neutrons are slowed from elastic and inelastic scattering with the incident media. The dominant reactions for producing gamma rays are inelastic scattering of fast neutrons, thermal neutron capture, and neutron activation. The fast neutron lifetimes are very small (a few microseconds) such that during the source pulse a mixed-energy neutron field exists. Shortly after the burst, all neutrons have been thermalized, and these thermal neutrons wander about until being captured with a lifetime of hundreds of microseconds.

Figure 2:
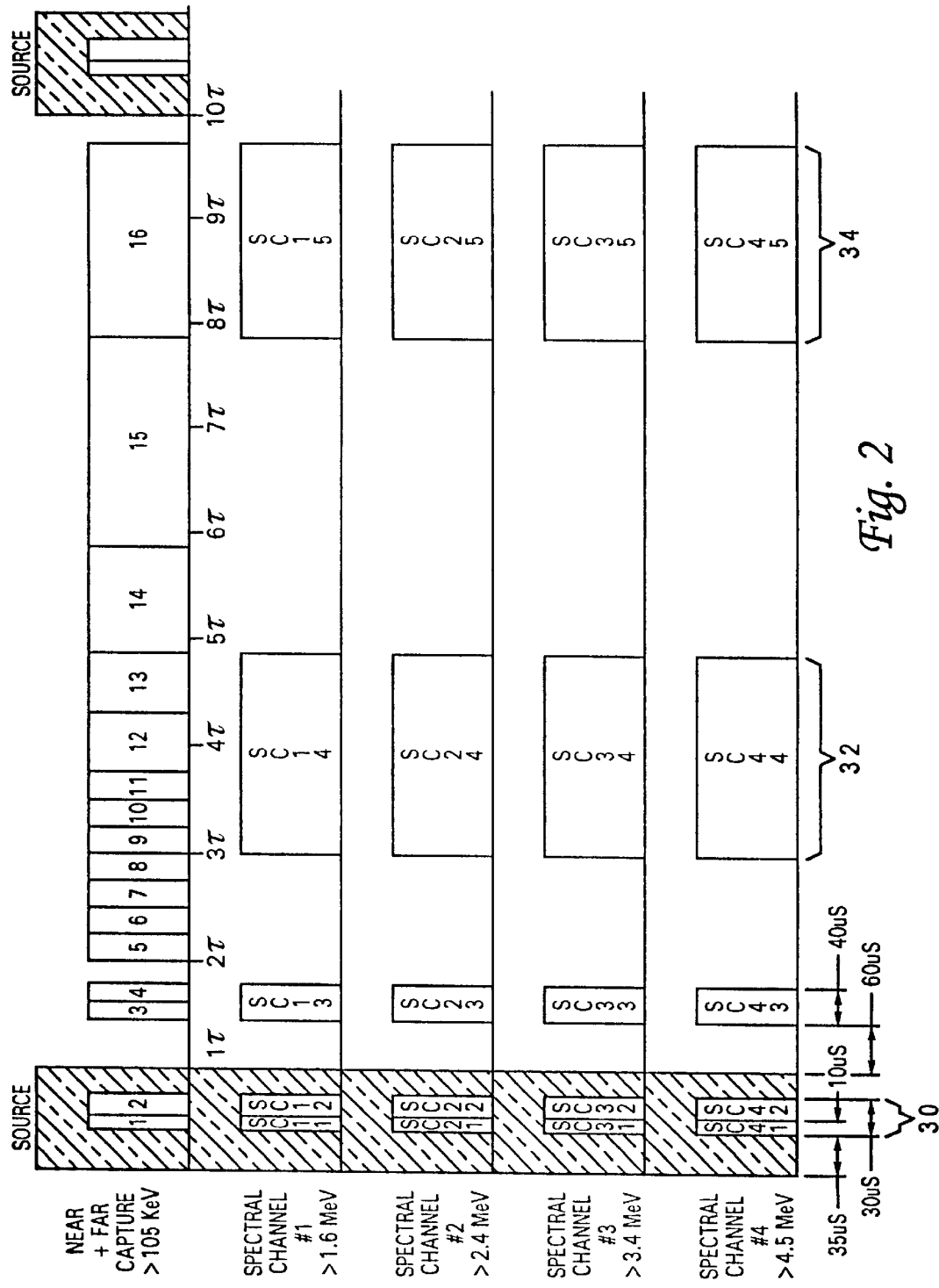
FIG. 2 is diagram depicting the counting of gamma-ray events in time-dependent and energy-dependent bins, according to one implementation of the present invention.
Figure 3:
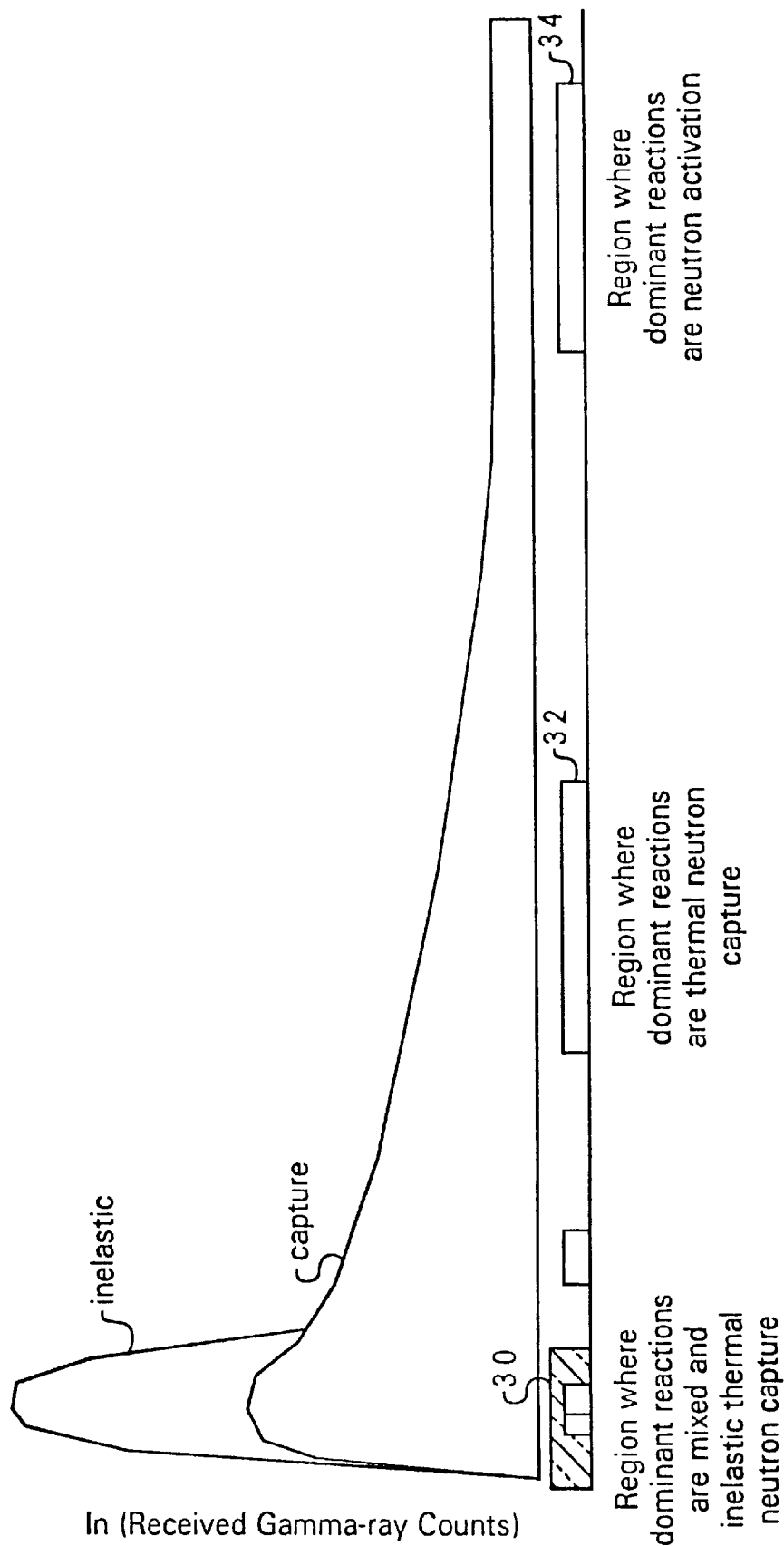
FIG. 3 is a graph depicting received gamma-ray counts over time, and illustrating the three different periods during which spectra samples are taken, in accordance with the implementation of FIG. 2.

As seen in FIGS. 2 and 3, gamma-ray counts are preferably collected in three time bins 30, 32 and 34 by counter hardware 26, which is synchronized with the source pulse. The time bin 30 during the burst collects gamma rays from the mixed-energy neutron field, while the second time bin 32 collects gamma rays primarily resulting from thermal neutron capture, and the third time bin 34 collects gamma rays primarily resulting from neutron activation. In the depicted embodiment, the bins are associated with five different spectral channels ranging from 105 KeV to 8 MeV, as described by the Computalog PND version 9 specification. The specific ranges depicted for the five spectral channels (greater than 105 KeV; greater than 1.6 MeV; greater than 2.4 MeV; greater than 3.4 MeV; and greater than 4.5 MeV) are selected in order to discern the characteristic peaks, but other energy ranges can be used. The number of energy channels and associated energy ranges can vary and can be optimized for this measurement; the five channels used were part of the standard specification for the Computalog PND System. As few as two or three channels might be used.

In this particular implementation, data is collected during a firing frame, that is, whose length is adjusted to match the decay of the radiation. For a typical formation the thermal neutron decay time constant might be 200 μs, then the pulse width is set to τ, (the exponential decay constant) such that PW=200 μs, and the repetition interval is set to ten times τ, such that the firing period or frame is 2000 μs. Time bin 30 lasts for about 10 μs and begins about 35 μs after the pulse has started. Time bin 32 lasts from 3*τ to 4.81*τ, for our typical (about τ=200 μs) this corresponds to 600 μs to 962 μs from the start of the neutron pulse. Time bin 34 spans the times 7.81*τ to 9.81*τ which corresponds to the time 1562 μs to 1962 μs after the neutron pulse. Those skilled in the art will appreciate that other implementations of the present invention could provide additional time bins (that is, more than three), or could use different bin durations or starting times. FIG. 2 further illustrates other time bins that may be utilized for measurements besides $P_e$, i.e., tool 12 can be adapted to measure multiple logging parameters. Data from approximately 500 pulses is accumulated in sonde controller 28 into a sample which is then transmitted to the surface, effectively averaging the gamma-ray spectrum.

Figure 4:
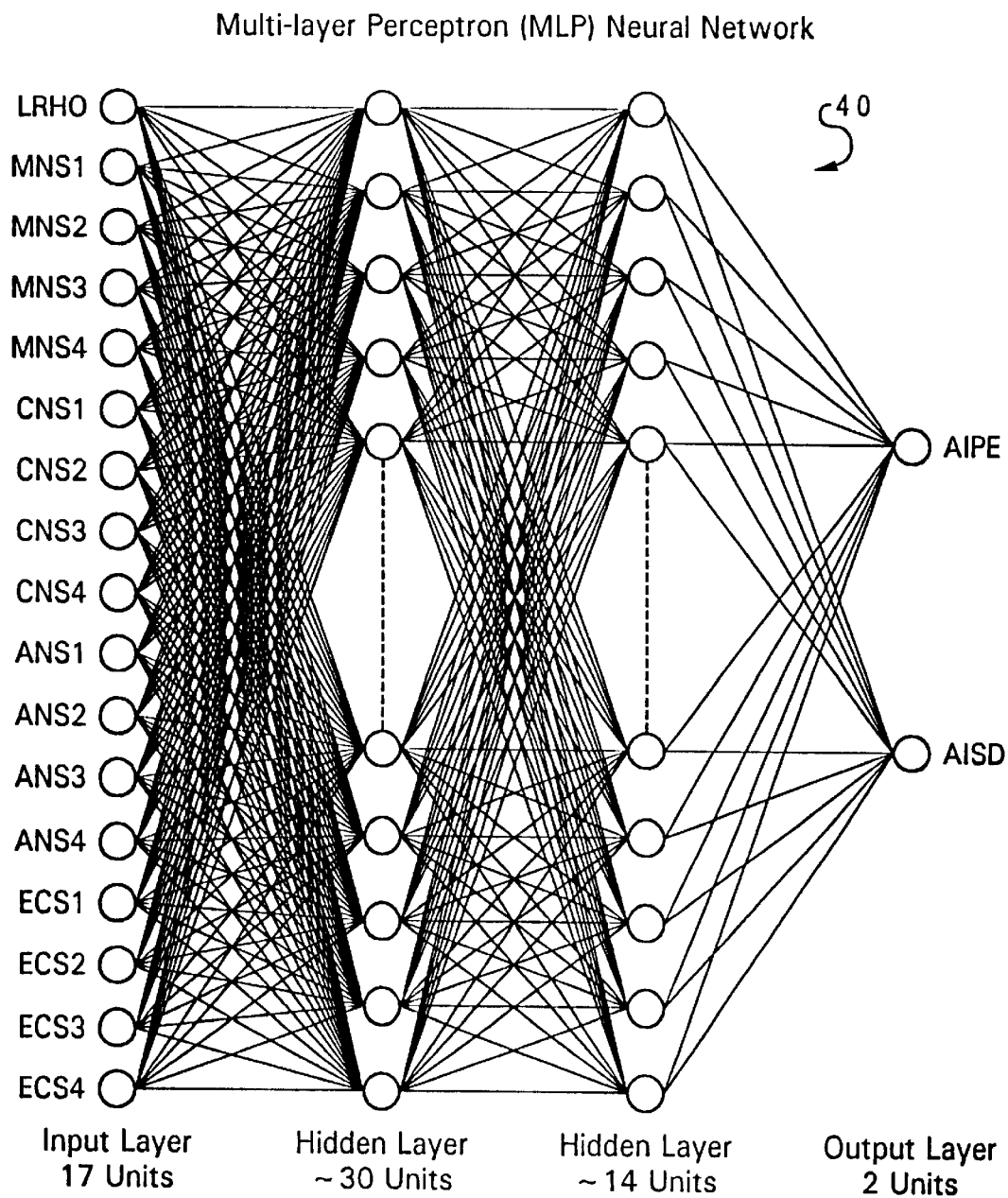
FIG. 4 is a high-level diagram depicting a neural network which may be used with the system of FIG. 1 to generate the $P_e$ cross-section of a geologic formation based on spectra samples taken in accordance with the implementation of FIGS. 2 and 3, as well as to generate the bulk density of the formation.

The present invention directly maps the neutron-induced spectroscopy measurements, to estimate or infer the formation photoelectric absorption cross-section. The $P_e$ measurement may then be used to determine the formation lithology as is known in the art. This novel mapping function may be carried out in various ways, one of which is shown in FIG. 4. Seventeen inputs are applied to a four-layer, multi-layer perceptron (MLP) neural network 40, from which two outputs are derived. The gamma-ray spectra inputs are generated by reducing the five-channel spectra to a is four-component normalized spectra wherein each channel is represented as a percent of the total count rate above 105 KeV. Normalization is achieved by simply dividing the counts of the four higher energy channels by the counts in the lowest energy channel (the bulk for that time frame).

For example, SC14 divided by the average of bins 9–13 (Near) is the normalized number for spectral channel SC14.

The primary inputs which are used by network 40 to determine the photoelectric absorption (output AIPE) are these normalized four-component spectra, sampled at the three different periods shown in FIGS. 2 and 3. The inputs ANS1 to ANS4 are sampled during the period where neutron activation is the dominant reaction (time bin 34). Thermal-neutron capture (time bin 32) is the dominant reaction for the inputs CNS1 to CNS4. A mixture of inelastic scattering and thermal neutron capture (time bin 30) are the dominant reactions for MNS1 to MNS4. Tool-to-tool variations in spectral settings can be calibrated out. Inputs ECS1 to ECS4 provide the response of the specific tool to a known standard environment. The final input "LRHO" is a spatial measurement of the gamma-ray transport length parameter (gamma diffusion length), and is input primarily for the optional estimation of the formation density (output AISD). For a discussion of the LRHO parameter, see U.S. patent application Ser. No. 08/878,545.

In this embodiment a Multi-Layer Perceptron (MLP) neural network was used to provide a multi-parametric mapping of the input data to the desired output data. The "neurons" of the network 40 are combined to form a general linear polynomial comprised of the weighted inner products of the inputs (in this example, the polynomial has over 3600 coefficients). Similar to mathematical tools such as Taylor Series Expansion, the general linear polynomial created by the neural network is sufficiently complex to model even non-linear trends in the data. The weights or coefficients of the polynomial are then adjusted to minimize the error between the polynomial value and the desired output through regression. The desired outputs consist of the $P_e$ Factor with known environments and parameters. Once the coefficients for a specific environment are determined (calibrated), the value of the polynomial can be used to measure the $P_e$ Factor in wells of similar specific environments. In applying the technology, sets of coefficients are developed for various standard environments such as casing and borehole size.

Figure 5:
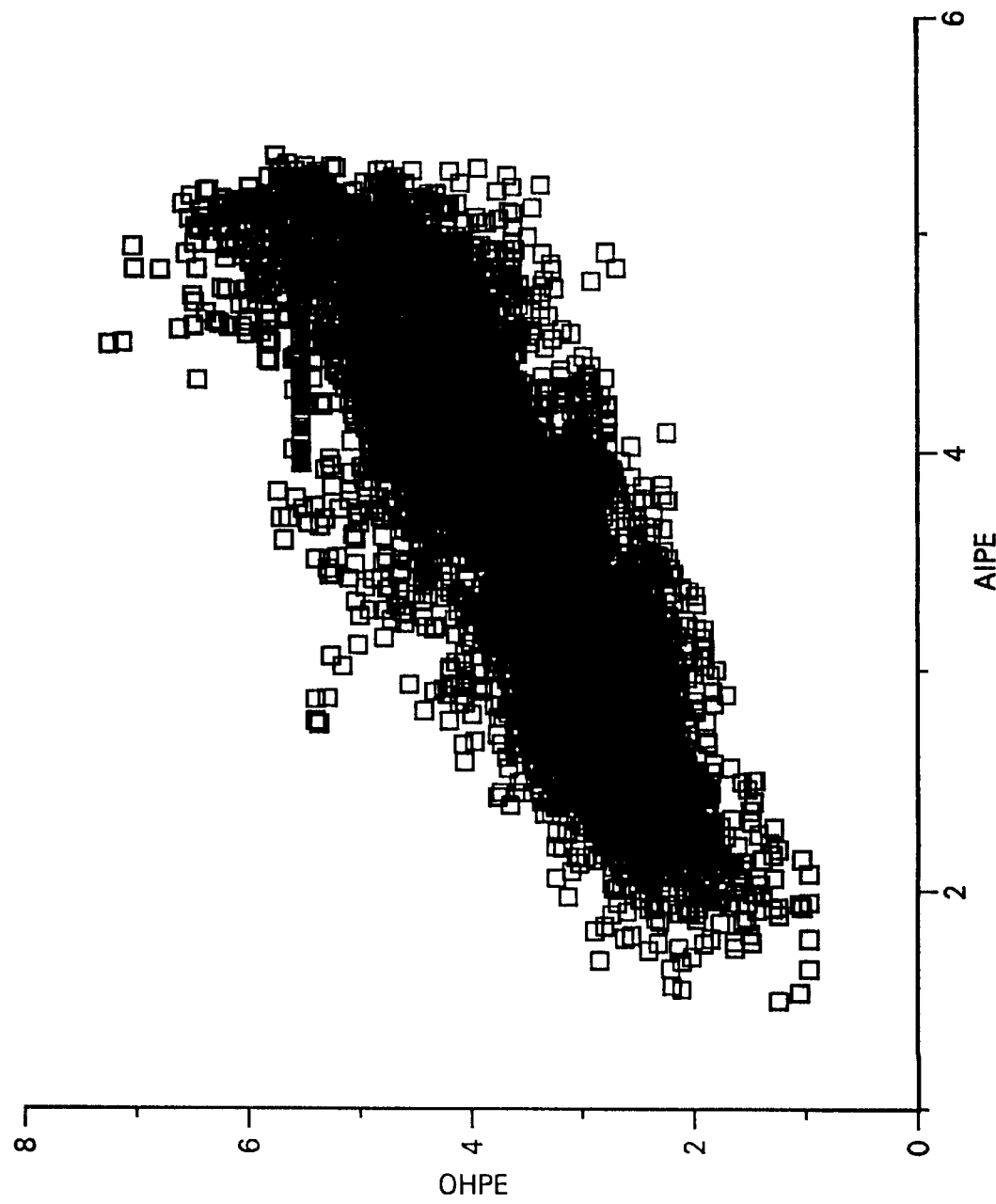
FIG. 5 is a graph depicting the fit of estimated $P_e$ values against open-hole $P_e$ measurements, which can be used to train the network of FIG. 4.

A sufficiently extensive database of measurements which are representative of the statistics and uncertainties in measuring $P_e$ can be used to "train" network 40. The training data may consist of $P_e$ (and density) measurements made with prior art techniques in an open hole before casing the well, and the subsequent PND data after casing the hole. FIG. 5 graphically illustrates a fit of exemplary estimated $P_e$ values to the open hole $P_e$ Factor measurements used as training data. For the 11,530 half-foot samples used in this particular calibration, the average RMS error was 0.44 $P_e$ units.

The $P_e$ Factor is dependent upon the atomic number. Most rock constituents are similar to magnesium, but calcium has an atomic number approximately twice that of the elements like magnesium. Basically the $P_e$ measurement shows the amount of calcium in the rock. $P_e$ measurements read the following for these different compounds:

4–4.5 for $CaCO_3$ (limestone)

3–3.5 for $MgCa (CO_3)_2$ (dolomite)

<3 for $SiO_2$ (sand)

~5 for $CaSO_4$ (anhydrite)

With the exception of iron, most other high $P_e$ elements are rare. Iron is useful in determining clay types.

There are no units for the $P_e$ Factor; this is used on logs and is proportional to $P_e$ absorption cross section which is measured in barns/electron.

Use of neural-network technology serves as one example for model development; however, similar results could be obtained with other response surface inversion tools, as will become apparent to those skilled in the art, such as development of an explicit model through factorial analysis and the regression to solve for model parameters.

Similarly, the calibration or training to open-hole data is merely one approach; the system could be calibrated, e.g., to data from laboratory models or computer simulations.

The present invention has several advantages, including a much deeper depth of investigation, and a larger sample size than with the standard gamma-ray attenuation measurement (LDT). The deeper penetration is particularly useful when investigating cased wells. The larger sample makes the measurement less sensitive to the geometry factors, such as borehole rugosity and tool-pad contact. Also, the larger sample means a small-diameter, mandrel-type tool (with no mechanical linkages or pad) can be used to take this measurement. Inference of this standard log-analysis parameter from cased-hole measurements can be advantageous, as the derived parameter will fit into existing analysis tools and paradigms (e.g. existing log analysis software packages).

Potential applications include field level correlations, quality control of open-hole PE measurements, and in-filling of log data bases in existing fields.

The foregoing direct inversion technique is statistically strong enough to estimate this standard parameter with one logging pass at 8 f.p.m. In contrast, conventional neutron-induced spectroscopy systems such as Halliburton's PSG device require many more passes and at a slower speed (the Jacobsen article cited in the Background suggests that 5 passes at 6 f.p.m. are required to adequately estimate the individual chemical constituents required to synthesize a measurement of the $P_e$ Factor). Use of the accelerator-based source has certain safety, regulatory, and liability (such as lost in the hole) advantages in comparison to the chemical-based sources of the open-hole LDT measurement.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of estimating the photoelectric absorption of a geologic formation, comprising the steps of:
   inducing gamma rays in the formation;
   detecting a gamma-ray spectrum associated with the gamma rays; and
   inferring the photoelectric absorption of the formation by directly mapping spectroscopic measurements of the gamma-ray spectrum, including the step of creating an inverse polynomial mapping of gamma-ray events in the gamma-ray spectrum.

2. The method of claim 1 wherein said detecting step derives the gamma-ray spectrum by averaging a plurality of measured gamma-ray spectra.

3. The method of claim 1 wherein said inferring step includes the step of sorting gamma-ray events of the gamma3 ray spectrum into time-dependent and energy-dependent bins.

4. The method of claim 1 wherein said creating step includes the steps of:
   applying the gamma ray measurements to respective inputs of a neural network; and
   using the neural network to minimize errors to solve for a set of coefficients for a polynomial associated with the inverse polynomial mapping, based on reference data.

5. The method of claim 1 wherein said inferring step includes the step of generating the spectroscopic measurements by counting gamma-ray events in a plurality of spectra channels having different energy ranges within the gamma-ray spectrum.

6. The method of claim 5 wherein said inferring step further includes the step of generating the spectroscopic measurements by counting gamma-ray events in a plurality of unnormalized spectra channels having different energy ranges within the gamma-ray spectrum, and reducing the unnormalized spectra channels to a plurality of normalized spectra channels wherein each normalized spectra channel is represented as a percent of a total count of the gamma-ray events.

7. The method of claim 1 wherein said inducing step includes the step of pulsing a fast neutron source proximate the formation.

8. The method of claim 7 wherein said inferring step includes the step of generating the spectroscopic measurements by sorting gamma-ray counts into at least three reaction-specific time bins, wherein a first one of the time bins occurs when a dominant gamma-ray reaction is caused by inelastic neutron scattering and thermal neutron capture, a second one of the time bins occurs when the dominant gamma-ray reaction is caused only by thermal neutron capture, and a third one of the time bins occurs when the dominant gamma-ray reaction is caused by neutron activation.

9. A device for estimating the photoelectric absorption of a geologic formation, comprising:
   means for inducing gamma rays in the formation;
   means for detecting a gamma-ray spectrum associated with the gamma rays; and
   means for inferring the photoelectric absorption of the formation by directly mapping spectroscopic measurements of the gamma-ray spectrum, said inferring means including means for creating an inverse polynomial mapping of gamma-ray events in the gamma-ray spectrum.

10. The device of claim 9 wherein said detecting means derives the gamma-ray spectrum by averaging a plurality of measured gamma-ray spectra.

11. The device of claim 9 wherein said inferring means includes means for sorting gamma-ray events of the gamma-ray spectrum into time-dependent and energy-dependent bins.

12. The device of claim 9 wherein said creating means includes neural network means for minimizing errors to solve for a set of coefficients for a polynomial associated with the inverse polynomial mapping, based on reference data, wherein said neural network means include a plurality of inputs which receive respective gamma-ray measurements.

13. The device of claim 9 wherein said inferring means includes means for generating the spectroscopic measurements by counting gamma-ray events in a plurality of spectra channels having different energy ranges within the gamma-ray spectrum.

14. The device of claim 13 wherein said inferring means further includes means for generating the spectroscopic measurements by counting gamma-ray events in a plurality of unnormalized spectra channels having different energy ranges within the gamma-ray spectrum, and reducing the unnormalized spectra channels to a plurality of normalized spectra channels wherein each normalized spectra channel is represented as a percent of a total count of the gamma-ray events.

15. The device of claim 9 wherein said inducing means comprises a fast neutron source.

16. The device of claim 15 wherein said inferring means includes means for generating the spectroscopic measurements by sorting gamma-ray counts into at least three reaction-specific time bins, wherein a first one of said time bins occurs when a dominant gamma-ray reaction is caused by mixed inelastic neutron scattering and thermal neutron capture, a second one of said time bins occurs when the dominant gamma-ray reaction is caused only by thermal neutron capture, and a third one of said time bin occurs when the dominant gamma-ray reaction is caused by neutron activation.

* * * * *